(No Model.)
J. DEWAR.
METHOD OF AND PROCESS FOR MARBLEIZING GLASS.
No. 304,802. Patented Sept. 9, 1884.
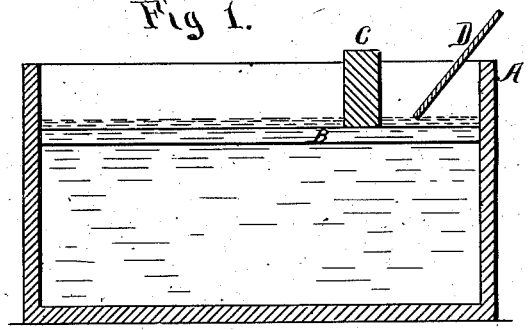
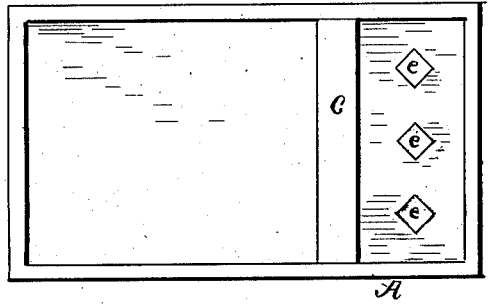
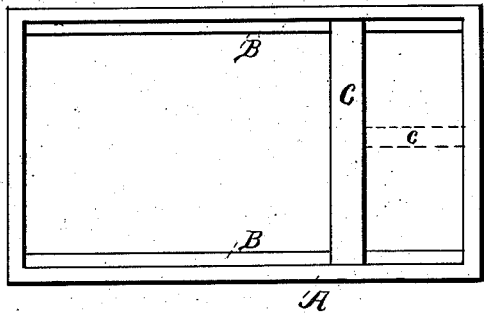
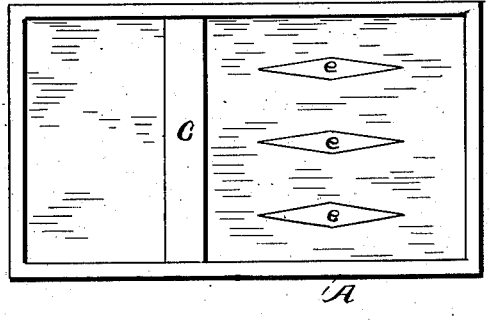
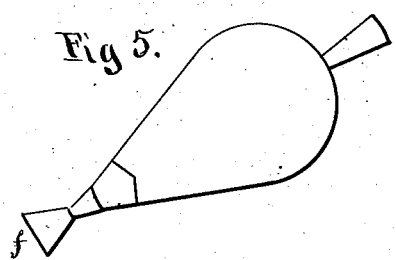
Witnesses:
M. E. Harrison
C. S. Johnston
Inventor:
John Dewar
By A. C. Johnston
Attorney

UNITED STATES PATENT OFFICE.

JOHN DEWAR, OF ALLEGHENY, PENNSYLVANIA.

METHOD OF AND PROCESS FOR MARBLEIZING GLASS.

SPECIFICATION forming part of Letters Patent No. 304,802, dated September 9, 1884.

Application filed July 17, 1884. (No specimens.)

*To all whom it may concern:*

Be it known that I, JOHN DEWAR, of Allegheny, in the county of Allegheny and State of Pennsylvania, have invented a new and useful Method of and Process for Marbleizing Glass; and I do hereby declare the following to be a full, clear, and exact description thereof.

My invention relates to an improvement in method and process for marbleizing glass, wood, and other articles; and it consists in sprinkling upon the surface of water different colors of paint, and spreading said colors evenly over the surface of the water, through the medium of an air-blast, and forming the outlines of any desired figure or figures in the film of colors on the surface of said water, and then elongating or spreading said film to any desired size, and then passing the glass, wood, or other article at an angle through the film of colors down into the water, thereby depositing upon the lower surface of the article a variegated coating of the colors with outline representations.

To enable others skilled in the art with which my invention is most nearly connected to make and use it, I will proceed to describe its construction and operation.

In the accompanying drawings, which form part of my specification, Figure 1 is a vertical and longitudinal section of the apparatus I employ for depositing a variegated coating of colors upon the surface of the glass or other article. Figs. 2, 3, 4 are top views of said apparatus. Fig. 5 represents a top view of an ordinary bellows having a wide discharge-aperture for obtaining a sheet of air from said bellows.

In the drawings, A represents an ordinary tank, which may be constructed of wood or other suitable material, and is provided with two bars, B B, secured to the side walls, and upon which is placed at right angle a bar, C, as indicated in Figs. 1 and 2.

The tank A is filled with water until the bars B B are covered. The confining-bar C is then arranged transversely on the bars B B, as shown in Figs. 1 and 3. Then by wisps made of broom-corn or other suitable material the different colors of paints are sprinkled upon the surface of the water between the bar C and the walls of the tank. The operator then, through the medium of a bellows, as shown in Fig. 5, or other blast device susceptible of forming a broad sheet of air, spreads the colors evenly over the surface of the water, and by means of a suitable tool draws the outline of any desired figure he may wish to represent on the surface of the glass or other article. For example, if the outlines of three squares, as shown at *e* in Fig. 3, are drawn in the film of colors, the operator then moves the bar C along on the bars B B, which will increase the area longitudinally of the film of colors, and the squares drawn in the film, as before mentioned, will be elongated, as shown in Fig. 4. If it is desired to spread the film of marbleizing material sidewise as well as lengthwise, two bars C are used, as indicated by dotted lines in Fig. 2, which arrangement of bars will be readily understood without further description. The operator then passes the sheet of glass or other article at an angle, as indicated at D in Fig. 1, through the film of colors, thereby depositing upon the under surface of the article a variegated coating representing a marbleized surface with outline representations of the figures drawn in the film of colors. The article thus coated is dried and, in case of glass, provided with a suitable backing, which backing in color should harmonize with the combination of various colors employed in making said coating. The glass should be thoroughly cleaned, and in case of wood the proper groundwork should be placed thereon before subjecting it to the marbleizing process.

In the preparation of the colors to be employed experience has demonstrated that the blending and union of the colors the one with the other is better accomplished by the mixing of each pigment in a mixture of boiled oil, turpentine, and varnish, each of which articles should be of the best quality and of about equal parts. To this compound of oil, turpentine, and varnish is added the pigment for obtaining the desired color. In case it is desired to simply place a border or single figure upon the glass or other article, that portion not to be marbleized may be coated with tallow or other analogous material, which may be subsequently readily removed. With this suggestion the skilled workman will readily comprehend what is necessary to be done when the glass or other article is only to be partially marbleized.

It will be observed that the object to be marbleized is passed through the film of colors on the surface of the water at an angle. This method of inserting the object is for the purpose of displacement of the air, whereby the marbleizing material is evenly deposited upon the surface of the article to be marbleized.

Having thus described my improvement, what I claim is—

1. The method and process herein described for marbleizing glass, consisting in sprinkling upon the surface of water different colors of paint and spreading said colors evenly upon the surface of the water through the medium of an air-blast, then forming the outline of any desired figure or figures in the film of colors on the surface of said water, and then elongating or spreading said film to any desired size, then passing the article to be marbleized through the film of colors down into the water, substantially as and for the purpose set forth.

2. The method herein described for increasing the area of the film of colors over the surface of the water in the tank to any desired extent by confining the marbleizing material to a portion of the surface of the water, and subsequently by moving the confining bar or bars C, substantially as and for the purpose specified.

In testimony whereof I have hereunto set my hand this 27th day of May, A. D. 1884.

JOHN DEWAR

Witnesses:
A. C. JOHNSTON,
C. S. JOHNSTON.